(12) United States Patent
Chen et al.

(10) Patent No.: US 7,432,324 B2
(45) Date of Patent: Oct. 7, 2008

(54) PREPARING AQUEOUS DISPERSION OF CRYSTALLINE AND AMORPHOUS POLYESTERS

(75) Inventors: Allan K. Chen, Oakville (CA); Tie Hwee Ng, Mississauga (CA); Paul D. Szabo, Islington (CA)

(73) Assignee: Xerox Corporation, Norwalk, CT (US)

( * ) Notice: Subject to any disclaimer, the term of this patent is extended or adjusted under 35 U.S.C. 154(b) by 588 days.

(21) Appl. No.: 11/094,413

(22) Filed: Mar. 31, 2005

(65) Prior Publication Data

US 2006/0223934 A1 Oct. 5, 2006

(51) Int. Cl.
*C08K 3/20* (2006.01)
*C08L 67/02* (2006.01)

(52) U.S. Cl. ..................... 524/539; 525/444
(58) Field of Classification Search .......... None
See application file for complete search history.

(56) References Cited

U.S. PATENT DOCUMENTS

| | | | |
|---|---|---|---|
| 3,590,000 A | 6/1971 | Palermiti et al. |
| 3,655,374 A | 4/1972 | Palermiti et al. |
| 3,674,736 A | 7/1972 | Lerman et al. |
| 3,720,617 A | 3/1973 | Chatterji et al. |
| 3,944,493 A | 3/1976 | Jadwin et al. |
| 3,983,045 A | 9/1976 | Jugle et al. |
| 4,007,293 A | 2/1977 | Mincer et al. |
| 4,079,014 A | 3/1978 | Burness et al. |
| 4,137,188 A | 1/1979 | Uetake et al. |
| 4,265,990 A | 5/1981 | Stolka et al. |
| 4,394,430 A | 7/1983 | Jadwin et al. |
| 4,560,635 A | 12/1985 | Hoffend et al. |
| 4,935,326 A | 6/1990 | Creatura et al. |
| 4,937,166 A | 6/1990 | Creatura et al. |
| 4,983,488 A | 1/1991 | Tan et al. |
| 4,996,127 A | 2/1991 | Hasegawa et al. |
| 5,066,560 A | 11/1991 | Tan et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,827,633 A | 10/1998 | Ong et al. |
| 5,840,462 A | 11/1998 | Foucher et al. |
| 5,853,944 A | 12/1998 | Foucher et al. |
| 5,858,601 A | 1/1999 | Ong et al. |
| 5,863,698 A | 1/1999 | Patel et al. |
| 5,869,215 A | 2/1999 | Ong et al. |
| 5,902,712 A | 5/1999 | Burns et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 6,830,860 B2 * | 12/2004 | Sacripante et al. ....... 430/109.3 |
| 7,029,817 B2 * | 4/2006 | Robinson et al. ....... 430/137.14 |
| 2006/0063086 A1 * | 3/2006 | Sacripante et al. ....... 430/109.4 |

\* cited by examiner

*Primary Examiner*—Robert Sellers
(74) *Attorney, Agent, or Firm*—Oliff & Berridge, PLC

(57) ABSTRACT

Processes for generating aqueous dispersions for use in the emulsion/aggregation technique, by combining crystalline polyester resin, amorphous polyester resin and water, heating and agitating the mixture and generating an aqueous dispersion containing both crystalline polyester resin particles and amorphous polyester resin particles.

8 Claims, No Drawings

PREPARING AQUEOUS DISPERSION OF CRYSTALLINE AND AMORPHOUS POLYESTERS

BACKGROUND

The present disclosure is directed to methods of generating an aqueous dispersion of crystalline polyester with a low degree of sulfonation for use in ultra low melt emulsion/aggregation (E/A) polyester applications. Additionally, this disclosure is directed to generating an aqueous dispersion process where low levels of sulfonated crystalline polyester resin is premixed in hot water followed by subsequent addition of a second polyester resin with a higher degree of sulfonation for use in ultra low melt E/A polyester applications.

Currently, aqueous dispersions can be generated by a process generally known as the solvent flash evaporation process. Solvent flash evaporation process is disclosed in U.S. patent application Ser. No. 10/778,557. In this process, the dispersion is created by dispersing resin in a volatile organic solvent. Volatile organic solvents include acetone, toluene, tetrahydrofuran, and the like. However, volatile organic solvents tend to be extremely volatile and explosions are possible. Thus, the solvent flash evaporation process must be conducted in an explosion proof environment.

Thus, there is a need to generate an aqueous dispersion having a small particle size and narrow size distribution under stable conditions without the use of such solvents.

Illustrated in U.S. Pat. No. 4,996,127 is a toner of associated particles comprising primarily particles of a polymer with acidic or basic polar groups, and which toners can be prepared by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component, and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. Reference may also be made to U.S. Pat. Nos. 674,736, 4,137,188 and 5,066,560.

Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and U.S. Pat. No. 5,346,797. Also of interest may be U.S. Pat. Nos. 5,348,832, 5,405,728, 5,366,841, 5,496,676, 5,527,658, 5,585,215, 5,650,255, 5,650,256, 5,501,935, 5,723,253, 5,744,520, 5,763,133, 5,766,818, 5,747,215, 5,827,633, 5,853,944, 5,804,349, 5,840,462, 5,869,215, 5,910,387, 5,919,595, 5,916,725, 5,902,710, 5,863,698, 5,925,488, 5,977,210 and 5,858,601.

The appropriate processes and components of these patents may be selected herein.

SUMMARY

In embodiments, described herein are processes of forming an aqueous dispersion of resin and/or toner particles, including melt-mixing a crystalline polyester resin and an amorphous polyester resin at a temperature of about 90° C. to about 220° C., adding the mixture into water, heating to a temperature of about 50° C. to about 150° C., and agitating. The process is preferably carried out substantially free of volatile organic solvents.

Preferably the crystalline polyester resin contains a sulfonation of less than about 2.5 mole % and the amorphous sulfonation polyester resin contains a sulfonation percentage greater than the sulfonation of the crystalline sulfonation polyester resin, more preferably the amorphous polyester resin contains a sulfonation between about 3.0 mole % and about 5.0 mole %.

In further embodiments, described are processes of forming an aqueous dispersion of resin and/or toner particles, including premixing a crystalline polyester resin in water below its dispersability to form a premixture, heating the premixture to a temperature of about 50° C. to about 150° C., adding an amorphous polyester resin to the premixture to form a mixture, and agitating the mixture. The process is preferably carried out substantially free of volatile organic solvents.

In this embodiment, preferably the crystalline polyester resin and the amorphous sulfonation polyester resin contain a sulfonation of between about 1.0 mole % and about 5.0 mole %. Preferably, the amorphous polyester resin contains a sulfonation between about 2.0 mole % and about 4.0 mole %.

Also in embodiments, described are toner particles prepared by the emulsion/aggregation technique via use of the aqueous dispersions described herein.

DETAILED DESCRIPTION OF EMBODIMENTS

The present disclosure involves the preparation of stable dispersions without the use of volatile organic solvents. Stable refers, for example, to submicron resin particles that remain suspended in solution for a period of time, e.g., at least a number of days or months, and preferably substantially indefinitely.

The stable dispersions may be prepared, for example, by the dissolution of at least one resin, and more specifically of both a crystalline polyester and amorphous polyester resin, into water. The dispersion can further include a colorant or wax. Reducing the amount of sulfonation selected in the resin used to form a stable emulsion without the use of surfactants improves toner charge control by reducing relative humidity (RH) sensitivity.

Also, embodiments relate to the direct preparation of toners and toner resins comprising an initial composition of sulfonated polyester particles, and wherein the polyester particles possess a low sulfonation percentage, such as between about 1 mole % and 5 mole %, and more specifically from 2.0 to about 4.0 mole %, and wherein toner compositions with an average volume diameter of from about 1 to about 25 microns, and more specifically from about 1 to about 10 microns, and a narrow GSD of, for example, from about 1.16 to about 1.26 or about 1.18 to about 1.28, as measured on the Coulter Counter can be obtained. The resulting toners can be utilized in known electrophotographic imaging methods, printing processes, including color processes, digital methods, and lithography.

In one embodiment, an aqueous dispersion is generated by premixing a crystalline sulfonated polyester resin in water below its dispersibility threshold, heating the premixture to a temperature of about 50° C. to about 150° C., followed by adding a linear or branched sulfonated amorphous polyester resin. The weight ratio of the crystalline polyester resin to the amorphous polyester resin present in the mixture is preferably from about 10:90 to about 50:50, more preferably from about 10:90 to about 30:70.

The dispersability threshold refers to the amount of resin that may be added to water and dissolved or dispersed to form a stable mixture. Crystalline sulfonated polyester resins having a sulfonation less than 2% are not readily dispersed in water. Thus, only a certain amount of resin may be added to the solvent before it falls out of solution.

The mixture of crystalline polyester resin and amorphous polyester resin is agitated for at least about half an hour to about 6 hours to generate the aqueous dispersion having both polyester resins. During agitation, the mixture is continuously heated.

Once the desirable aqueous dispersion is obtained, i.e., containing nanometer particles as a stable dispersion, then the mixture is cooled to room temperature for storage. The agitation is continued during the entire process until the dispersion reaches room temperature.

It is believed that premixing the crystalline resin in water below its dispersibility threshold facilitates the dissociation of solids into submicron particles. The addition of sulfonated amorphous polyester resin and further mixing of the mixture in water enhances the water-dispersibility of the resins in the water, forming a stable aqueous dispersion.

The crystalline polyester resin is preferably first added into the water. The crystalline polyester resin is preferably added in an amount less than 5 weight % of the solution, although greater amounts may be used if desired. The added crystalline sulfonated polyester resin preferably contains about 1.0 mole % to about 5.0 mole % sulfonation, and preferably between about 1.35 mole % and about 2.0 mole % sulfonation. Though a greater sulfonation degree will improve the crystalline polyester resin's dispersibility in water, the resulting toner particles may exhibit charge control problems.

The amorphous polyester resin is added to the solution containing the crystalline polyester resin. In one preferred embodiment, the amount of amorphous polyester resin added is such that the total amount of polyester resin (crystalline polyester resin and amorphous polyester resin) is 10 weight % of the solution or less. Again, greater amounts of resin may be included, but dispersibility may be reduced. The amorphous polyester resin preferably contains a sulfonation percentage of about 1.0 mole % to about 5.0 mole % of resin, more preferably between about 2.0 mole % and 4.0 mole % of resin, and most preferably about 3.75 mole % of resin.

In a second embodiment, an aqueous dispersion is generated by melt-mixing a crystalline sulfonated polyester resin and a linear or branched sulfonated amorphous polyester resin at a temperature of about 90° C. to about 220° C. The mixture is then added to water and heated to a temperature of about 50° C. to about 150° C. The mixture of crystalline polyester resin and amorphous polyester resin is agitated from about half an hour to about 6 hours to generate the aqueous dispersion having both polyester resins. The weight ratio of the crystalline polyester resin to amorphous polyester resin present in the aqueous dispersion is from about 10:90 to about 50:50, preferably from about 10:90 to about 30:70.

In embodiments described herein, the aqueous dispersion is generated without the use of volatile organic solvents such as acetone, toluene, tetrahydrofuran, and the like. In other words, the processes and the toner are substantially free of volatile organic solvents.

It is assumed that the sulfonated amorphous polyester resin is dispersed within the crystalline polyester resin matrix such that discrete crystalline polyester domains are formed. Then the polyester blend is dispersed in hot water. The sulfonated amorphous polyester resin disperses readily in water together with the crystalline polyester resins, yielding nanometer size particles in the water. The size of the particles in water range from 5 nm to 950 nm, preferably from 10 nm to 400 nm.

The crystalline polyester resin is preferably added with amorphous polyester resin into the hot water. The crystalline polyester resin is preferably added in an amount less than 5 weight % of the solution, although greater amounts may be used if desired. The added crystalline polyester resin preferably contains between about 1.0 mole % and about 5.0 mole % sulfonation, and preferably between about 1.35 mole % and about 2.0 mole % sulfonation. The amorphous polyester resin is added in an amount so that the total amount of polyester resin (crystalline polyester resin and amorphous polyester resin) is approximately 10 weight % of the solution or less. Again, greater amounts of resin may be included, but dispersibility may be reduced. The amorphous polyester resin contains between about 1.0 mole %. sulfonation and about 5 mole % sulfonation, preferably between about 2.0 mole % and 4.0 mole %, and most preferably about 3.75 mole %.

Examples of crystalline resins suitable for use herein include, for example, alkali sulfonated polyester resin. Specific crystalline resin examples include by are not limited to alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly (5-sulfo-isophthaloyl)-copoly (propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly (propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), and wherein alkali is a metal such as sodium, lithium or potassium.

The crystalline resin can possess various melting points of, for example, from about 30° C. to about 120° C., and preferably from about 50° C. to about 90° C., and, for example, a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by Gel Permeation Chromatography using polystyrene standards. The molecular weight distribution (Mw/Mn) of the crystalline resin is, for example, from about 2 to about 6, and more specifically, from about 2 to about 4.

The crystalline resins may be prepared by the polycondensation process of reacting an organic diol, and an organic diacid in the presence of a polycondensation catalyst, although making the crystalline polyester resin is not limited to such process. Generally, a stochiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and can be selected in an amount, for example, of from about 0.01 to about 1 mole percent of the resin. Additionally, in place of an organic diacid, an organic diester can also be selected, and where an alcohol byproduct is generated.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline resins include oxalic acid, succinic acid, glutaric acid, adipic acid, suberic acid, azelaic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfo-aliphatic diacid can be selected in an amount of from about 1 to about 10 mole percent of the resin.

The linear and branched amorphous sulfonated polyester resins, in embodiments possess, for example, a number average molecular weight (Mn), as measured by GPC, of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and a molecular weight distribution (Mw/Mn) of, for example, from about 1.5 to about 6, and more specifically, from about 2 to about 4.

The linear amorphous polyester resins are generally prepared by the polycondensation of an organic diol and a diacid or diester, at least one of which is sulfonated or a sulfonated difunctional monomer being included in the reaction, and a polycondensation catalyst. For the branched amorphous sulfonated polyester resin, the same materials may be used, with the further inclusion of a branching agent such as a multivalent polyacid or polyol.

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester are selected, for example, from about 45 to about 52 mole percent of the resin. Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and mixtures thereof. The amount of organic diol selected can vary, and more specifically, is, for example, from about 45 to about 52 mole percent of the resin.

Alkali sulfonated difunctional monomer examples, wherein the alkali is lithium, sodium, or potassium, include dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpent-anediol, sulfo-p-hydroxybenzoic acid, mixtures thereto, and the like. Effective difunctional monomer amounts of, for example, from about 0.1 to about 2 weight percent of the resin can be selected.

Branching agents for use in forming the branched amorphous sulfonated polyester include, for example, a multivalent polyacid such as 1,2,4-benzene-tricarboxylic acid, 1,2, 4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Polycondensation catalyst examples for either the crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

The obtained polyester dispersion prepared by any of the foregoing methods can be mixed with a colorant and then followed by aggregation and/or coalescence to create toner particles as illustrated herein.

Various known colorants, especially pigments, present in the toner in an effective amount of, for example, from about 1 to about 65, more specifically from about 2 to about 35 percent by weight of the toner, and yet more specifically in an amount of from about 1 to about 15 weight percent, include carbon black like REGAL 330®; and magnetites, such as Mobay magnetites MO8029™, MO8060™; and the like. As colored pigments, there can be selected known cyan, magenta, yellow, red, green, brown, blue or mixtures thereof. Specific examples of colorants, especially pigments, include phthalocyanine HELIOGEN BLUE L6900™, D6840™, D7080™, D7020™, cyan 15:3, magenta Red 81:3, Yellow 17, the pigments of U.S. Pat. No. 5,556,727, the disclosure of which is totally incorporated herein by reference, and the like. Examples of specific magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of specific cyans that may be selected include copper tetra(octadecyl sulfonamide) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative specific examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The colorants, such as pigments, selected can be flushed pigments as indicated herein and not dry pigments.

Colorants include pigments, dyes, mixtures of pigments, mixtures of dyes, and mixtures of dyes and pigments, and the like, and preferably pigments.

Optionally, a wax can be present in an amount of from about 4 to about 12 percent by weight of the particles. Examples of waxes, if present, include polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K.K., and similar materials. The commercially available polyethylenes selected usually possess a molecular weight of from about 1,000 to about 1,500, while the commercially available polypropylenes utilized for the toner compositions of the present invention are believed to have a molecular weight of from about 4,000 to about 5,000. Examples of functionalized waxes include amines, amides, imides, esters, quaternary amines, carboxylic acids or acrylic polymer emulsion, for example JONCRYL™ 74, 89, 130, 537, and 538, all available from SC Johnson Wax, chlorinated polypropylenes and polyethylenes commercially available from Allied Chemical and Petrolite Corporation and SC Johnson wax.

The toner may also include known charge additives in effective amounts of, for example, from 0.1 to 5 weight percent, such as alkyl pyridinium halides, bisulfates, the charge control additives of U.S. Pat. Nos. 3,944,493, 4,007,293, 4,079,014, 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Surface additives that can be added to the toner compositions after washing or drying include, for example, metal salts, metal salts of fatty acids, colloidal silicas, metal oxides like titanium, tin and the like, mixtures thereof and the like, which additives are usually present in an amount of from about 0.1 to about 2 weight percent, reference U.S. Pat. Nos. 3,590,000, 3,720,617, 3,655,374 and 3,983,045, the disclosures of which are totally incorporated herein by reference. Preferred additives include zinc stearate and flow aids, such as fumed silicas like AEROSIL R972™ available from Degussa Chemicals, or silicas available from Cabot Corporation or Degussa Chemicals, each in amounts of from about 0.1 to about 2 percent, which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,990, the disclosure of which is totally incorporated herein by reference.

The following Examples are provided to further illustrate various species of the present disclosure, it being noted that these Examples are intended to illustrate and not limit the scope of the present disclosure.

PREPARATION OF CPE-1

Exactly 45 kg of sebacic acid, 2.1 kg. Of 5-lithium sulfoisophthalic acid, 32.76 kg of ethylene glycol and 75 g of Fascat-4100™ (a catalyst containing dibutyltinoxide hydroxide) were charged into a stainless steel reactor. The mixture was agitated at 120 rpm. The reactor was then heated to 190° C. where it is held to remove water as distillate. Approximately 1.8 kg of water as distillate was collected in approximately one hour. In order to achieve a gradual removal of water, the reactor temperature was gently stepped up from 190° C. to 200° C. and finally to 210° C. so that all the water from the esterification stage could be removed. A total of 8.8 kg of water was collected as distillate in 5 hours.

The second stage was the polycondensation step. At this stage, a slight vacuum was applied to remove excess glycol from the reaction. The end point of was determined by the melt viscosity. The target viscosity measured at 80° C. was between 200-500 Pa.s. As the viscosity increased, higher vacuum was applied to facilitate maximum removal of the excess glycol from the reaction. After a total of 12 hours of full vacuum at elevated temperatures, a final resin viscosity of 210 Pa.s. was obtained. The hot molten polyester was discharged and let cool to solidify. The polyester resin was then fritzmilled into smaller particle sizes for latex preparation.

PREPARATION OF SPE-1

Exactly 185.8 kg of dimethyl terephthalate, 23.1 g of dimethyl 5-sulfoisophthalate sodium salt, 147.1 kg of propylene glycol, 64.8 kg of dipropylene glycol and 0.48 kg of Fascat-4100™ were charged into a stainless steel reactor. The mixture was agitated at 80 rpm. The reactor was then heated to 200° C. where it is held to remove methanol as the esterification byproduct. Approximately 60 kg of methanol as distillate was collected at 200° C. Removing methanol from the reactor system was a gentle slow process. Usually the reactor temperature was gradually raised to 220° C. over four to five hours so that all methanol could be removed. A total of 62 kg of methanol was collected as distillate in five hours.

The next stage was the polycondensation step. At this stage, a slight vacuum was applied to remove excess glycol from the reaction. The end point of the reaction was determined by the softening temperature. The target softening temperature was between 150° C. and 155° C. for the SPE resin. As the softening temperature increased, higher vacuum was applied to the reactor system to facilitate a maximum removal of all excess glycol from the reaction. After a total of 8 hours of full vacuum at elevated temperatures, 113.4 kg of glycol was removed. The final resin softening point was 150° C. with onset Tg=59.9° C. At the end of the polycondensation step the resin was discharged hot into a metal container, cooled and subsequently ground to reduce its particle size to granular powder.

EXAMPLE 1

A 10% aqueous mixture was prepared by adding 10 g of CPE-1 resin powder to 900 g of cold deionized water in a beaker, heating to 95° C. for about 3 hours, followed by adding 90 g of SPE-1 resin powder and holding at 95° C. for an additional 3 hours. The hot mixture with CPE/SPE ratio of 1:9 was occasionally mixed with a high shear probe at 6000 rpm to assist in the resin dispersion. After cooling to room temperature, the resulting dispersion has a particle size of 25 nm as measured by a particle size analyzer. The dispersion prepared by this technique has a relatively narrow size distribution with a single peak.

EXAMPLE 2

A 10% aqueous mixture was prepared adding 20 g of CPE-1 resin powder to 900 g of cold deionized water in a beaker, heating to 95° C. for about 3 hours, followed by adding 80 g of SPE-1 resin powder and holding at 95° C. for an additional 3 hours. The hot mixture with CPE/SPE ratio of 2:8 was occasionally mixed with a high shear probe at 6000 rpm to assist in the resin dispersion. After cooling to room temperature, the resulting dispersion has a particle size of 29 nm as measured by a particle size analyzer. The dispersion prepared by this technique has a relatively narrow size distribution with a single peak.

EXAMPLE 3

A 10% aqueous mixture was prepared adding 35 g of CPE-1 resin powder to 900 g of cold deionized water in a beaker, heating to 95° C. for about 3 hours, followed by adding 65 g of SPE-1 resin powder and holding at 95° C. for an additional 3 hours. The hot mixture with CPE/SPE ratio of 2:8 was occasionally mixed with a high shear probe at 6000 rpm to assist in the resin dispersion. After cooling to room temperature, the resulting dispersion has a particle size of 29 nm as measured by a particle size analyzer. The dispersion prepared by this technique has a relatively narrow size distribution with a single peak.

COMPARATIVE EXAMPLE 1

3.5 g CPE and 6.5 g SPE resin powders were added to the water simultaneously and heated to 95° C. for the same period as in Examples 1-3. A 10% solids dispersion containing a combination of CPE:SPE equal to 3.5:6.5 ratio was prepared. The hot mixture was occasionally mixed with a high shear probe at 6000 rpm to assist in the resin dispersion. At the end, the dispersion was allowed to cool to room temperature. The resulting dispersion has a particle size of 62 nm as measured by a particle size analyzer. The dispersion prepared by the method of this comparative example resulted in larger particles in addition with a non-uniform bimodal particle size distribution.

PREPARATION OF SPE-2

Exactly 928.5 g of dimethyl terephthalate, 115.4 g of dimethyl 5-sulfoisophthalate sodium salt, 735.0 g of propyelene glycol, 324.0 g of dipropylene glycol and 2.4 g of Fascat-4100® were charged into a stainless steel reactor. The mixture was agitated at 60 rpm. The reactor was then heated to 190° C. where it is held to remove methanol as the esterification byproduct. Approximately 100 g of methanol as distillate was collected at 190° C. Removing methanol from the reactor system was a slow process. Usually the reactor temperature was gradually raised to 200° C. over four to five hours so that all methanol could be removed. A total of 150 g of methanol was collected as distillate in five hours.

The next stage was the polycondensation step. At this stage, a slight vacuum was applied to remove excess glycol from the reaction. The end point of the reaction was determined by the softening temperature. The target softening temperature was between 160° C. and 166° C. for the SPE resin. As the softening temperature increased, higher vacuum was applied to the reactor system to facilitate a maximum removal of all excess glycol from the reaction. After a total of 13 hours of full vacuum at elevated temperatures, a final resin softening point was 167° C. with onset Tg=59.9° C. At the end of the polycondensation step the resin was discharged hot into a metal container, cooled and subsequently ground to reduce its particle size to granular powder was obtained.

MELT MIXING SPE-2 AND CPE-1 TO FORM A POLYESTER BLEND

The hot molten SPE-2 polyester resin was allowed to mix continuously at 200° C. A pre-weighed 500 g of CPE resin was charged into the reactor and let mix for approximately 2 hours to form a melt blend having a ratio of SPE:CPE of 65:35 composition. The melt mixed resin was then discharged into a metal container and allowed to cool to room temperatures. The resin was co-milled into granular particles for subsequent emulsion latex preparation.

EXAMPLE 4

Aqueous Dispersion of the Polyester Blend in a Solvent-Less Process

A 10% aqueous mixture was prepared by adding 100 g of the above resin powder to 900 g of cold deioinized water. The mixture was then heated to 95° C. and held there for about 6 hours under constant agitation. The hot mixture was occasionally mixed with a high shear probe at 6000 rpm to assist in the resin dispersion. The SPE/CPE dispersion was allowed to cool to room temperature. The resulting dispersion has a particle size of 133.9 nm as measured by a particle size analyzer.

COMPARATIVE EXAMPLE 2

Aqueous Dispersion of Solid Mixture Without Melt Mixing

A 10% aqueous polyester mixture was prepared by adding 65 g of SPE resin and 35 g of CPE resin to 900 g of deioinized water. When the same mixing and heating profile as described in Example 4 was applied, the resulting dispersion showed a bimodal size distribution which is less desirable for the emulsion/aggregation particle growth process.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A process, comprising:
   melt-mixing a crystalline sulfonated polyester resin and an amorphous sulfonated polyester resin at a temperature of about 90° C. to about 220° C.;
   heating water to a temperature of about 50° C. to about 150° C.;
   adding the mixture of resins into the heated water; and
   agitating the mixture and the water to generate an aqueous dispersion.

2. The process according to claim 1, wherein the amorphous polyester resin is a linear amorphous sulfonated polyester resin or a branched amorphous sulfonated polyester resin.

3. The process according to claim 1, wherein the crystalline sulfonated polyester resin and amorphous sulfonated polyester resin each contain a sulfonation between about 1.0 mole % and about 5.0 mole %.

4. The process according to claim 1, wherein the crystalline sulfonated polyester resin is less than 5 weight % of the aqueous dispersion.

5. The process according to claim 1, wherein a ratio of the crystalline sulfonated polyester resin to the amorphous polyester resin in the aqueous dispersion is from about 10:90 to about 50:50.

6. The process according to claim 1, wherein the resins form particles in the aqueous dispersion, having a size of between about 10 nm and 400 nm.

7. The process according to claim 1, wherein the process is conducted substantially free of solvent.

8. The process according to claim 1, wherein the adding further includes addition of a colorant and/or wax.

* * * * *